United States Patent
Ju et al.

(10) Patent No.: US 11,952,442 B2
(45) Date of Patent: Apr. 9, 2024

(54) METHOD FOR PREPARING VINYL CHLORIDE-BASED POLYMER

(71) Applicant: LG CHEM, LTD., Seoul (KR)

(72) Inventors: Jin Hyuck Ju, Daejeon (KR); Hyun Min Lee, Daejeon (KR); Hyun Kyou Ha, Daejeon (KR); Kun Ji Kim, Daejeon (KR); Kwang Jin Lee, Daejeon (KR); Yang Jun Jeon, Daejeon (KR); Jae Hyun Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 684 days.

(21) Appl. No.: 17/251,589

(22) PCT Filed: Oct. 28, 2019

(86) PCT No.: PCT/KR2019/014268
§ 371 (c)(1),
(2) Date: Dec. 11, 2020

(87) PCT Pub. No.: WO2020/091340
PCT Pub. Date: May 7, 2020

(65) Prior Publication Data
US 2021/0253751 A1  Aug. 19, 2021

(30) Foreign Application Priority Data
Oct. 29, 2018  (KR) .................. 10-2018-0129864

(51) Int. Cl.
*C08F 14/06* (2006.01)
*C08F 2/18* (2006.01)
*C08F 2/22* (2006.01)
*C08F 2/44* (2006.01)
*C08K 3/26* (2006.01)
*C08K 3/30* (2006.01)

(52) U.S. Cl.
CPC ............... *C08F 14/06* (2013.01); *C08F 2/18* (2013.01); *C08F 2/22* (2013.01); *C08F 2/44* (2013.01); *C08K 3/26* (2013.01); *C08K 3/30* (2013.01); *C08K 2003/262* (2013.01); *C08K 2003/265* (2013.01); *C08K 2003/267* (2013.01)

(58) Field of Classification Search
CPC .... C08F 14/06; C08F 2/18; C08F 2/22; C08F 2/24; C08F 2/26; C08F 2/30; C08K 3/26; C08K 3/30
See application file for complete search history.

(56) References Cited

U.S. PATENT DOCUMENTS

| | | | |
|---|---|---|---|
| 4,286,081 A | 8/1981 | Mikofalvy et al. | |
| 5,130,374 A | 7/1992 | Cozens et al. | |
| 5,422,399 A | 6/1995 | Cozens et al. | |
| 6,242,541 B1 * | 6/2001 | Hohenadel | C08F 14/06 526/345 |
| 2015/0274901 A1 | 10/2015 | Ko et al. | |

FOREIGN PATENT DOCUMENTS

| | | | |
|---|---|---|---|
| CN | 1102934 C | 3/2003 | |
| CN | 1631920 A | 6/2005 | |
| CN | 100368444 C | 2/2008 | |
| CN | 101787166 A | 7/2010 | |
| CN | 105440219 A | 3/2016 | |
| CN | 105968272 A | 9/2016 | |
| JP | H10110005 A | 4/1998 | |
| KR | 2013-0120629 A | 11/2013 | |
| KR | 10-2014-0093366 A | 7/2014 | |
| KR | 10-1445240 B1 | 9/2014 | |
| KR | 10-2015-0037250 A | 4/2015 | |
| KR | 10-2016-0058567 A | 5/2016 | |
| KR | 10-2018-0047361 A | 5/2018 | |
| KR | 20180047361 A * | 5/2018 | .............. C08F 14/06 |
| WO | 2013-092730 A1 | 6/2013 | |

OTHER PUBLICATIONS

Machine-generated English-language translation of KR-20180047361-A.*

* cited by examiner

*Primary Examiner* — Vu A Nguyen
(74) *Attorney, Agent, or Firm* — Bryan Cave Leighton Paisner LLP

(57) ABSTRACT

The present disclosure provides a method for preparing a vinyl chloride-based polymer, the method including a step of injecting an ionizable normal salt and polymerizing a vinyl chloride monomer in the presence of one or more emulsifiers and a polymerization initiator, wherein the ionizable normal salt includes a carbonate metal salt or a sulfite metal salt, and the ionizable normal salt is continuously injected in an amount of 70 to 1200 ppm based on the total weight of the vinyl chloride monomer when a polymerization conversion rate is in a range of 0% to 20%. The method capable of preparing a vinyl chloride-based polymer suitable as an eco-friendly material, while not affecting the rate of polymerization reaction and decreasing the generation amount of total volatile organic compounds by controlling the injection time, injection amount and kind of the ionizable normal salt, is provided.

5 Claims, No Drawings

METHOD FOR PREPARING VINYL CHLORIDE-BASED POLYMER

CROSS-REFERENCE TO RELATED APPLICATIONS

The present application is a National Stage Application of International Application No. PCT/KR2019/014268, filed Oct. 28, 2019, and claims the benefit of priority based on Korean Patent Application No. 10-2018-0129864, filed on Oct. 29, 2018, the entire contents of which are incorporated herein by reference.

TECHNICAL FIELD

The present disclosure relates to a method for preparing a vinyl chloride-based polymer, which improves productivity and decreases the amount of total volatile organic compounds generated.

BACKGROUND ART

A vinyl chloride-based polymer is a polymer including 50% or more of repeated units derived from a vinyl chloride monomer (VCM), cheap and easy to control the hardness thereof, and applicable in most processing instruments, and thus, has various application fields. In addition, since a molded article having excellent physical and chemical properties, for example, mechanical strength, weather resistance, chemical resistance, etc., may be provided, the vinyl chloride-based polymer is widely used in various fields.

Meanwhile, a vinyl chloride-based resin is a material for living and industry and is a general-purpose resin which is the most widely used in the world. Generally, a straight vinyl chloride-based resin is prepared as particulate particles with a size of about 100-200 μm by a suspension polymerization method, and a paste vinyl chloride-based resin is prepared as particulate particles with a size of about 0.1-2 μm by an emulsion polymerization method.

Generally, the paste vinyl chloride-based resin is obtained by drying latex obtained by emulsion polymerization by a spray drying method to form final resin particles, and dispersing the particles in a solvent or a plasticizer, and then is applied to products such as flooring materials, wall papers, tarpaulins, raincoats, gloves, car underbody coatings, sealants and carpet tiles, through processes such as coating (reverse roll-coating, knife coating, screen coating, spray coating), gravure and screen printing, rotation casting, and shell casting and dipping.

Particularly, recently, there is a growing interest in eco-friendly products with the small content of total volatile organic compounds (TVOC), and many companies put a lot of efforts for minimizing the TVOC content in various product groups, and the requirements on such products of which eco-friendliness is emphasized are being increasing.

Accordingly, a number of studies for decreasing total volatile organic compounds which are generated from molded articles manufactured using vinyl chloride-based polymers are being conducted, and studies on various additives and plasticizers used as supplementary materials are mainly conducted.

However, various kinds of regulations on environment are consistently increasing, and there are limitations in decreasing the generation degree of total volatile organic compounds to a certain degree or less by only replacing a plasticizer used as a supplementary material. Accordingly, a method for decreasing total volatile organic compounds generated from a vinyl chloride-based polymer itself while maintaining effective physical properties of the vinyl chloride-based polymer is found, but there are limitations in applying in practice, because reactivity decreases, and reaction time increases in the conventional polymerization method.

PRIOR ART DOCUMENT

Patent Document (Patent Document 1) Korean Laid-open Patent Publication No. 10-2016-0058567

DISCLOSURE OF THE INVENTION

Technical Problem

The present invention is devised to solve the problems of the conventional technique and provides a method for preparing a vinyl chloride-based polymer having decreased amount of total volatile organic compounds generated and having excellent productivity so as to be suitable for an eco-friendly material by injecting an ionizable normal salt at the initial stage of polymerization immediately after initiating polymerization and controlling the injection time, injection amount and kind of the ionizable normal salt.

Technical Solution

In an embodiment of the present invention to solve the above tasks, there is provided a method for preparing a vinyl chloride-based polymer, including a step of injecting an ionizable normal salt and polymerizing a vinyl chloride monomer in the presence of one or more emulsifiers and a polymerization initiator, wherein the ionizable normal salt includes a carbonate ($CO_3^{2+}$) metal salt or a sulfite ($SO_3^{2-}$) metal salt, and is continuously injected in an amount of 70 to 1200 ppm based on the total weight of the vinyl chloride monomer when a polymerization conversion rate is in a range of 0% to 20%.

Advantageous Effects

In the present invention, productivity is secured to an excellent level, while the amount of total volatile organic compounds generated is decreased, and the vinyl chloride-based polymer suitable for an eco-friendly material may be prepared by injecting an ionizable normal salt at an initial stage immediately after initiating polymerization and controlling the injection time, injection amount and kind thereof so as not to adversely affect the rate of polymerization reaction.

BEST MODE FOR CARRYING OUT THE INVENTION

Hereinafter, the present invention will be described in more detail to assist the understanding of the present invention.

It will be understood that words or terms used in the description and claims shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

DEFINITION OF TERMS

The term "polymer" used in the present disclosure refers to a polymer compound prepared by polymerizing monomers, irrespective of the same or different kinds. Like this, a general term polymer comprehensively include a homopolymer which is commonly used to refer to a polymer prepared from only one kind of monomer, and an interpolymer as defined below.

The term "vinyl chloride-based polymer" used in the present disclosure represents all compounds produced by polymerizing a vinyl chloride-based monomer and may mean a polymer chain derived from a vinyl chloride-based monomer.

The term "plastisol" used in the present disclosure represents a mixture of a resin and a plasticizer so as to mold, cast or process into a continuous film phase by heating, for example, may represent a paste phase obtained by mixing a vinyl chloride-based polymer and a plasticizer.

The term "composition" used in the present disclosure includes a mixture of materials including a corresponding composition as well as a reaction product formed from the materials of the corresponding composition and the decomposition product of the corresponding composition.

The term "ionizable normal salt" used in the present disclosure is a salt which may be ionized in a solvent and means a salt in a state where all hydrogen ions (Hi) or hydroxide ions (OH⁻) are substituted during forming a salt and does not remain, and may be distinguished from an acid salt in which hydrogen ions remain or a base salt in which hydroxide ions remain.

In the present disclosure, an average particle diameter ($D_{50}$) may be defined as a particle diameter corresponding to 50% of number accumulated amount in a particle diameter distribution curve of particles. The average particle diameter ($D_{50}$) may be measured using, for example, a laser diffraction method. The laser diffraction method may generally measure the particle diameter from a submicron region to about a few mm degree, and results with high reproduction and high resolution may be obtained.

1. Method for Preparing Vinyl Chloride-Based Polymer

In an embodiment of the present invention, there is provided a method for preparing a vinyl chloride-based polymer, including a step of injecting an ionizable normal salt and polymerizing a vinyl chloride monomer in the presence of one or more emulsifiers and a polymerization initiator, wherein the ionizable normal salt includes a carbonate metal salt or a sulfite metal salt, and the ionizable normal salt is continuously injected in an amount of 70 to 1200 ppm based on the total weight of the vinyl chloride monomer when a polymerization conversion rate is in a range of 0% to 20%.

Generally, in preparing a vinyl chloride-based polymer, a sulfonate-based emulsifier and a sulfate-based emulsifier are the most widely used, and the sulfate-based emulsifier is known to generate a particularly large amount of total volatile organic compounds. Accordingly, a technique decreasing the generation of the total volatile organic compounds from the vinyl chloride-based polymer itself, especially the vinyl chloride-based polymer prepared using the sulfate-based emulsifier is required. However, if a reducing agent of the total volatile organic compounds is used, significant difference is shown in respect of productivity, and accordingly, the commercial and wide use thereof has restrictions.

That is, conventionally, a material used as the reducing agent of total volatile organic compounds has been injected at the initial stage of reaction to change the conditions in a reactor to basic and to decrease the total volatile organic compounds, but in this case, there are problems of significantly decreasing polymerization productivity due to a polymerization time delay, and in case of using NaOH which is a strong base, there are problems of decreasing polymerization productivity, generating total volatile organic compounds, over-foaming, etc.

Accordingly, a method for preparing a vinyl chloride-based polymer utilizing an ionizable normal salt is suggested as a method for preparing a vinyl chloride-based polymer, providing a vinyl chloride-based polymer with a small generation amount of total volatile organic compounds while maintaining polymerization productivity similar to or better than the conventional method.

That is, the ionizable normal salt is a material which is capable of reducing the generation amount of total volatile organic compounds which may be generated from a vinyl chloride-based polymer itself, and by suitably controlling the injection point, injection amount and kind of the ionizable normal salt during polymerization, productivity improvement may be expected, and the generation amount of the total volatile organic compounds may be significantly reduced.

According to an embodiment of the present invention, the ionizable normal salt is injected immediately after initiating polymerization between a point where a polymerization conversion rate is 0% to a point where a polymerization conversion rate is 20%. Here, the point where immediately after initiating polymerization means after injecting raw materials such as water and an emulsifier as supplementary materials to a reactor, applying vacuum to the reactor, injecting a vinyl chloride monomer and a polymerization initiator, and elevating the inner temperature of the reactor to a polymerization temperature, and refers to a point where polymerization reaction begins, which may mean a point where a polymerization conversion rate is 0%. If the ionizable normal salt is injected when the supplementary materials are injected before the polymerization conversion rate is counted as 0%, the generation phenomenon of total volatile organic compounds occur as per usual, and decreasing effects may not be achieved at all. If the injection amount is increased, the generating amount of the total volatile organic compounds may possibly be reduced but problems of markedly decreasing productivity may arise.

In addition, if the ionizable normal salt is injected in the middle of polymerization after a point where a polymerization conversion rate is 20%, it is apprehended that the decreasing effects of total volatile organic compounds may be halved, and if the ionizable normal salt is injected in a later stage of polymerization, the decreasing effects of total volatile organic compounds may be difficult to achieve with the same amount of the ionizable normal salt, but an excessive amount to a significant degree may be required to be injected.

In order to solve such problems and more suitably accomplish the productivity and the decreasing effects of the generation amount of the total volatile organic compounds, the injection may be performed when a polymerization conversion rate is in a range of 0% to 15%, more preferably, 0% to 10%.

According to an embodiment of the present invention, the ionizable normal salt may be injected in an amount of 70 to 1200 μm, preferably, 100 to 1000 ppm based on the total weight of the vinyl chloride monomer. If the amount of the ionizable normal salt is less than 70 ppm, no decreasing effects on the generation amount of the total volatile organic compounds may be achieved, and if an excessive amount greater than 1200 ppm is injected, the pH of a resin after drying maintains a high state of 11 or more, and overfoaming with an open cell shape, by which cells in a sheet are burst during foaming treatment may arise, and the production of normal products may become impossible.

According to an embodiment of the present invention, the ionizable normal salt may include a carbonate metal salt or a sulfite metal salt, and the metal in the carbonate metal salt and the sulfite metal salt may be suitably selected from alkali metals or alkaline earth metals, and preferably, may make a pair with sodium. For example, sodium carbonate ($Na_2CO_3$), potassium carbonate ($K_2CO_3$), magnesium carbonate ($MgCO_3$), calcium carbonate ($CaCO_3$), sodium sulfite ($NaSO_3$), potassium sulfite ($K_2SO_3$), magnesium sulfite ($MgSO_3$), calcium sulfite ($CaSO_3$), etc., may be applied, and preferably, sodium carbonate ($Na_2CO_3$), potassium carbonate ($K_2CO_3$), magnesium carbonate ($MgCO_3$) or calcium carbonate ($CaCO_3$) may be applied as the carbonate metal salt, and sodium sulfite ($NaSO_3$) may be applied as the sulfite metal salt. Most preferably, sodium carbonate may be applied.

Generally used strongly basic materials such as sodium hydroxide show no improving effects on decreasing the generation amount of total volatile organic compounds, and though partly improved, productivity may be significantly degraded, or in case of foaming treating through a plastisol processing, it is apprehended that problems such as overfoaming may occur. In case where a material performing the dimerization reaction of the same material, such as sodium bicarbonate is injected, it is apprehended that the generation of an ionizable normal salt may be slow in progress, and a larger amount may be required.

In addition, a material such as potassium phosphate is injected as an acid-based material which may play the role of a buffer agent, the generation amount of total volatile organic compounds is significantly increased when compared with the productivity increasing degree, and fatal problems including not applicable to eco-friendly products may be involved. In addition, the conversion process of the vinyl chloride monomer into a vinyl chloride-based polymer is exothermic reaction, and it tends to acidify with the progress of polymerization. If an acid-based material is additionally added, polymerization reaction may be accelerated further, but other side reactions are also promoted, and fogging phenomenon may arise severely.

In addition, as the salt in which hydrogen ions are partially remain, if an acidic salt is applied instead of a normal salt, suitable effects could not be obtained considering an injection amount due to the reaction between acidic salts. For example, in case of sodium bicarbonate ($NaHCO_3$), normal action could not be expected because of the active reaction of two molecules of the sodium bicarbonate.

Accordingly, in order to accomplish both effects of decreasing the generation amount of total volatile organic compounds and increasing productivity while effectively performing polymerization reaction and efficiently preventing side reactions, the use of the ionizable normal salt is preferable.

As described above, if the ionizable normal salt is suitably controlled and injected for polymerization, all the above-described conventional problems may be solved, and all effects relating to productivity and the decrease of the generation amount of total volatile organic compounds may be achieved. A plastisol using thereof may have excellent viscosity properties and processability properties, and a processed vinyl chloride-based polymer may have excellent foaming performance or heat resistance.

In the method for preparing a vinyl chloride-based polymer according to an embodiment of the present invention, the polymerization may be performed by including a step of injecting supplementary materials including an emulsifier and water to a reactor; a step of applying vacuum to the reactor and then injecting a polymerization initiator and a vinyl chloride monomer; and a step of continuously injecting an ionizable normal salt to the reactor after the inner temperature of the reactor reached 30 to 70° C., and if the injection time and amount of the ionizable normal salt are controlled, such divided steps may not be specifically limited but may be applied for more clearly understanding the injection time.

Particularly, the step of injecting the supplementary materials may mean before injecting a monomer and an initiator and may mean a step of initially injecting a series of raw materials required for polymerization reaction to a reactor. In addition, the injection time of the monomer and initiator may be a point after injecting the supplementary materials and after applying vacuum to the reactor, and in this case, a vinyl chloride monomer may be injected together with a suitable polymerization initiator. Finally, the injection step of the ionizable normal salt means before initiating the reaction and after elevating the inner temperature of the reactor to a polymerization temperature, and the injection of the ionizable normal salt may be performed after heating the reactor, and this point may be understood as a point where a polymerization conversion rate is 0%.

The kind of materials injected as the supplementary materials, the polymerization temperature, the kind of the polymerization initiator, the kind of the emulsifier, etc., may be suitably selected according to the kind of emulsion polymerization, which will be explained later.

The method for preparing a vinyl chloride-based polymer according to the present invention may be composed of a polymerization method which is commonly used in the art, and particularly, the polymerization may be conducted by pure emulsion polymerization, seed emulsion polymerization, or microsuspension polymerization.

Hereinafter, the seed emulsion polymerization, microsuspension polymerization and emulsion polymerization will be explained separately.

Seed Emulsion Polymerization

If the polymerization is seed emulsion polymerization, the polymerization step may include a step of preparing a seed mixture including a first seed and a second seed (step i); and a step of injecting a vinyl chloride-based monomer to the seed mixture and polymerizing (step ii).

According to the present invention, the seed emulsion polymerization is characterized in injecting the above-described ionizable normal salt when a polymerization conversion rate is in a range of 0 to 20% in the polymerization of the step ii.

Here, the seed emulsion polymerization may mean seed emulsion polymerization.

Step i

The step i is a step of mixing a first seed and a second seed, which have different average particle diameters to prepare a seed mixture in order to increase the bonding force of the vinyl chloride-based monomer and provide a finally produced vinyl chloride-based polymer with bimodal effects.

The seed mixture may be a mixture of the first seed and the second seed in a suitable weight ratio according to the purpose without specific limitation, but may particularly be mixed in a weight ratio of the first seed and the second seed of 1:1 to 3:1.

Hereinafter, the first seed will be explained in particular.

The first seed may be prepared by injecting 100 parts by weight of a vinyl chloride-based monomer and 0.1 parts by weight to 5 parts by weight of a first emulsifier to a reactor filled with a polymerization initiator, homogenizing, and emulsion polymerizing at a temperature of 30° C. to 70° C.

The reactor filled with the polymerization initiator may represent a reactor containing a mixture solution including a polymerization initiator, and the mixture solution may further include water, a separate emulsifier, a reaction suppressor, a dispersant, etc. in addition to the polymerization initiator, without limitation.

The polymerization initiator may preferably be used in 0.01 parts by weight to 2 parts by weight based on 100 parts by weight of the vinyl chloride-based monomer, and the average particle diameter of the first seed finally produced may be controlled according to the amount used of the polymerization initiator. For example, with the increase of the amount used of the polymerization initiator, the average particle diameter of the first seed finally produced may decrease.

The average particle diameter (D50) of the first seed particles may be 0.5 μm to 1.0 μm.

The polymerization initiator is not specifically limited and may use one or more among a water-soluble initiator and an oil-soluble initiator, for example, one or more oil-soluble polymerization initiators selected from the group consisting of peroxy carbonates, peroxy esters and azo-based compounds. Particularly, the oil-soluble polymerization initiator may be one or more selected from the group consisting of lauryl peroxide (LPO), di-2-ethylhexyl peroxycarbonate (OPP), diisopropyl peroxy dicarbonate, t-butyl peroxypivalate, tert-butylperoxyneodecanoate and 2,2-azobisisobutyronitrile, for example, lauryl peroxide (LPO), di-2-ethylhexyl peroxycarbonate (OPP), or a mixture thereof.

The first emulsifier may be one or more selected from the group consisting of sodium lauryl sulfate, lauryl benzene sulfonic acid, alpha-olefin sulfonate, sodium dodecyl benzene sulfonate, sodium lauryl ethoxylated sulfate, sodium octadecyl sulfate, sodium lauryl ether sulfate and linear chain alkylbenzene sulfonate. In addition, the separate emulsifier may be the same as the first emulsifier or included therein.

In addition, the reaction suppressor is not specifically limited, and may use, for example, paraquinone, hydroquinone, butylated hydroxytoluene, monomethyl ether hydroquinone, tert-butyl catechol, diphenylamine, triisopropanolamine, triethanolamine, etc.

In addition, the dispersant is not specifically limited, and may use, for example, higher alcohols such as lauryl alcohol, myristic alcohol and stearyl alcohol, or higher fatty acids such as lauryl acid, myristic acid, palmitic acid and stearic acid.

The homogenization is not specifically limited but may be performed by homogenizing at a temperature of 20° C. or less, preferably, a temperature of 5° C. to 15° C., using a homogenizer for 1 hour to 3 hours. In this case, the homogenizer is not specifically limited and a commonly used one well-known in the art may be used. For example, a rotor-stator type homogenizer may be used, and the total pressure of the homogenizer during homogenizing process may be 1000 psi to 2000 psi. In addition, a polymerization mixture may be distributed to the front part and rear part of the homogenizer for homogenization as necessary.

The emulsion polymerization for preparing the first seed may be performed at a temperature of 30° C. to 70° C. as described above, and particularly, the emulsion polymerization may be initiated by elevating the temperature from the temperature for performing homogenization by 40° C. to 50° C. and carrying out the emulsion polymerization for 5 hours to 15 hours.

Hereinafter, the second seed will be explained in particular.

The second seed may be prepared through the following method:

a) a step of injecting 100 parts by weight of a vinyl chloride-based monomer to a reactor filled with a first emulsifier and initiating polymerization at a temperature of 30° C. to 70° C.; and b) a step of continuously injecting a second emulsifier during polymerization and performing emulsion polymerization for 4 hours to 10 hours.

The reactor filled with the first emulsifier of the step a) represents a reactor containing an emulsion including the first emulsifier, and the emulsion may include water, a polymerization initiator, etc. in addition to the first emulsifier.

The first emulsifier may be used in 0.01 parts by weight to 1 part by weight based on 100 parts by weight of the vinyl chloride-based monomer. According to the amount used of the first emulsifier, the average particle diameter of the second seed finally produced may be controlled. For example, with the increase of the amount used of the first emulsifier, the average particle diameter of the second seed finally produced may increase.

The average particle diameter (D50) of the second seed may be 0.05 μm to 0.5 μm.

The polymerization initiator may be a water-soluble polymerization initiator, and particularly, one or more selected from the group consisting of potassium persulfate, ammonium persulfate and hydrogen peroxide.

The second emulsifier of the step b) may be continuously injected to the reactor during emulsion polymerization, and may be used in 0.01 parts by weight to 6 parts by weight based on 100 parts by the vinyl chloride-based monomer.

Particular kind of the first emulsifier is the same as described above, and the second emulsifier may be the same as the above-described first emulsifier or included therein, and the first emulsifier and the second emulsifier used in the present invention may mean different kinds of materials, or may mean only the injection order. Accordingly, the first emulsifier and the second emulsifier may be the same material or different materials.

Step ii

The step ii is a step of injecting a vinyl chloride-based monomer to a seed mixture of the first seed and the second seed, prepared in the step i and initiating polymerization to perform polymerization for obtaining a vinyl chloride-based polymer, and is a step where the injection usage of an ionizable normal salt is applied. Particular injection point, injection amount, etc., are the same as described above.

The polymerization of the step ii is not limited, but may be performed by injecting a vinyl chloride-based monomer, sodium borate and a first emulsifier to a vacuum reactor containing a mixture of the seed mixture and water. In addition, the first emulsifier may be continuously injected during polymerization, and the polymerization reaction may be performed by additionally injecting an additive such as a polymerization initiator, a molecular weight controller and an electrolyte as necessary.

Particularly, the polymerization may be initiated after injecting 100 parts by weight of a vinyl chloride-based monomer to a vacuum reactor including 70 parts by weight to 120 parts by weight of water and 1 part by weight to 20 parts by weight of a seed mixture including the first seed and the second seed based on 100 parts by weight of the vinyl chloride-based monomer in a temperature range of 30° C. to 70° C. In addition, 0.2 parts by weight to 2.5 parts by weight of the first emulsifier based on 100 parts by weight of the vinyl chloride-based monomer may be continuously injected during the reaction, and the reaction may be performed by additionally injecting additives such as 0.1 parts by weight to 1.5 parts by weight of a polymerization initiator, 0.5 parts by weight to 2.0 parts by weight of an electrolyte, and 0.1 parts by weight to 1.0 part by weight of a molecular weight controller based on 100 parts by weight of the vinyl chloride-based monomer as necessary. In addition, a dispersant, etc., may be included during the polymerization without limitation, and preferably, the dispersant may not be included.

Here, the vinyl chloride-based monomer may mean a vinyl chloride monomer alone, or a mixture of a vinyl chloride monomer and a vinyl-based monomer which is capable of copolymerizing therewith. That is, the vinyl chloride-based polymer according to an embodiment of the present invention may be a homopolymer of vinyl chloride, a copolymer of a vinyl chloride monomer and a vinyl-based monomer which is copolymerizable therewith. If the vinyl chloride-based polymer is the copolymer, vinyl chloride may be included in 50% or more.

The vinyl-based monomer which is copolymerizable with the vinyl chloride-based monomer is not specifically limited. For example, olefin compounds such as ethylene, propylene and butene, vinyl esters such as vinyl acetate, vinyl propionate and vinyl stearate, unsaturated nitriles such as acrylonitrile, vinyl alkyl ethers such as vinyl methyl ether, vinyl ethyl ether, vinyl octyl ether and vinyl lauryl ether, halogenated vinylidenes such as vinylidene chloride, unsaturated fatty acids such as acrylic acid, methacrylic acid, itaconic acid, maleic acid, fumaric acid, maleic anhydride and itaconic anhydride and the anhydrides of the fatty acids, unsaturated fatty acid esters such as methyl acrylate, ethyl acrylate, monomethyl maleate, dimethyl maleate and butylbenzyl maleate, crosslinkable monomers such as diallyl phthalate, etc., may be used, and the vinyl-based monomer may be used alone or as a combination of two or more thereof.

The polymerization initiator is classified into an oil-soluble polymerization initiator and a water-soluble polymerization initiator, and a suitable polymerization initiator may be used according to use and need. The water-soluble polymerization initiator may be one or more selected from the group consisting of potassium persulfate, ammonium persulfate and hydrogen peroxide, and the oil-soluble initiator may be one or more selected from the group consisting of peroxy carbonates, peroxy esters and azo-based compounds.

The molecular weight controller is not specifically limited but may be, for example, n-butyl mercaptan, n-octyl mercaptan, n-dodecyl mercaptan, tert-dodecyl mercaptan, etc. The electrolyte may be one or more selected from the group consisting of potassium chloride, sodium chloride, potassium bicarbonate, sodium carbonate, potassium carbonate, potassium hydrogen sulfite, sodium hydrogen sulfite, tetrapotassium pyrophosphate, tetrasodium pyrophosphate, tripotassium phosphate, trisodium phosphate, dipotassium hydrogen phosphate and disodium hydrogen phosphate. The electrolyte is not specifically limited, but may be one or more selected from the group consisting of potassium chloride, sodium chloride, potassium bicarbonate, sodium carbonate, potassium carbonate, potassium hydrogen sulfite, sodium hydrogen sulfite, tetrapotassium pyrophosphate, tetrasodium pyrophosphate, tripotassium phosphate, trisodium phosphate, dipotassium hydrogen phosphate and disodium hydrogen phosphate.

In addition, the polymerization may include a homogenization process, and the homogenization may be performed through the method described above. Other additives such as a reaction suppressor may be the same as described above.

Microsuspension Polymerization

If the polymerization is microsuspension polymerization, the step of polymerization may be a step of injecting an oil-soluble polymerization initiator and a vinyl chloride-based monomer to a vacuum reactor filled with an emulsifier, an auxiliary emulsifier and water, homogenizing, and performing microsuspension polymerization at a temperature of 30° C. to 70° C.

Also in the microsuspension polymerization, if the continuous injection of an ionizable normal salt in an amount of 70 to 1200 ppm when a polymerization conversion rate is in a range of 0% to 20% is satisfied, the same effects may be achieved, and particulars on the injection time, injection amount, kind, etc. may be the same as described above.

The reactor filled with the emulsifier, the auxiliary emulsifier and the water represents a reactor including a mixture solution including the emulsifier, the auxiliary emulsifier and the water, and the mixture solution may further include additives such as a reaction suppressor, 0.5 parts by weight to 2.0 parts by weight of an electrolyte, and 0.1 parts by weight to 2.0 parts by weight of a molecular weight controller in addition to the emulsifier, auxiliary emulsifier and water as necessary, without limitation. The additive may be the same as described above. A dispersant, etc. may be included in the microsuspension polymerization, but is not limited thereto. Particular kind of the dispersant is the same as described above.

In the microsuspension polymerization, the emulsifier may be injected in 0.1 parts by weight to 5 parts by weight, preferably, 0.1 parts by weight to 2.0 parts by weight based on 100 parts by weight of the vinyl chloride-based monomer, and the kind of the emulsifier may be the same as the above-described first emulsifier or may be included therein.

The auxiliary emulsifier may be injected in 0.1 parts by weight to 6.0 parts by weight, preferably, 0.1 parts by weight to 3.0 parts by weight based on 100 parts by weight of the vinyl chloride-based monomer, and the auxiliary emulsifier may include alcoholic compounds of 12 to 16 carbon atoms.

The oil-soluble polymerization initiator may be injected in 0.01 parts by weight to 2 parts by weight based on 100 parts by weight of the vinyl chloride-based monomer, and particular kind of the oil-soluble polymerization initiator is the same as described above.

In addition, the microsuspension polymerization preferably includes a homogenizing process, because particle sizes may be controlled through the homogenizing process. Particularly, the homogenizing process may be performed by the same method as described above.

Pure Emulsion Polymerization

If the polymerization is emulsion polymerization, the step of polymerizing the vinyl chloride-based monomer (S1) may be a step of injecting a vinyl chloride-based monomer, etc. to a vacuum reactor filled with a first emulsifier and a water-soluble polymerization initiator, and reacting at a temperature of 30° C. to 70° C. In addition, separate from the first emulsifier, a second emulsifier may be additionally injected during polymerization, and the second emulsifier may be continuously injecting during polymerization.

Also in the pure emulsion polymerization, if the continuous injection of an ionizable normal salt in an amount of 70 to 1200 ppm when a polymerization conversion rate is in a range of 0% to 20% is satisfied, the same effects may be achieved, and particulars on the injection time, injection amount, kind, etc. may be the same as described above.

The reactor filled with the first emulsifier and the water-soluble polymerization initiator represents a reactor including a mixture including the first emulsifier and the water-soluble polymerization initiator, and the mixture may further include an additive such as water, a dispersant, a reaction suppressor, a molecular weight controller and an electrolyte in addition to the first emulsifier and the water-soluble polymerization initiator.

The first emulsifier may be used in 0.005 parts by weight to 0.5 parts by weight based on 100 parts by weight of the vinyl chloride-based monomer, and the kind of the first emulsifier is the same as described above.

The water-soluble polymerization initiator may be used in 0.01 parts by weight to 2.0 parts by weight based on 100 parts by weight of the vinyl chloride-based monomer, and the water-soluble polymerization initiator may be one or more selected from the group consisting of potassium persulfate, ammonium persulfate and hydrogen peroxide.

In addition, the second emulsifier is continuously injected to the reactor during polymerization and may be used in 0.01 parts by weight to 6 parts by weight based on 100 parts by weight of the vinyl chloride-based monomer. The second emulsifier may be the same as the first emulsifier or included therein. The first emulsifier and the second emulsifier used in the present invention may mean different kinds of materials, or may mean only the injection order. Accordingly, the first emulsifier and the second emulsifier may be the same material or different materials.

Additives such as 0.5 parts by weight to 2.0 parts by weight of an electrolyte, 0.1 parts by weight to 2.0 parts by weight of a molecular weight controller, and a reaction suppressor may be additionally injected based on 100 parts by weight of the vinyl chloride-based monomer as necessary and then, the reaction may be performed. Here, particular kinds of the electrolyte, molecular weight controller and reaction suppressor may be the same as described above.

According to the present invention, a step of drying the vinyl chloride-based polymer thus prepared may be further included, and in this case, the drying may be performed by a commonly known method in the art without specific limitation, particularly, by a spray drying method. Prior to the drying, steps of dehydration and washing may be further included.

2. Vinyl Chloride-Based Polymer

The vinyl chloride-based polymer according to the present invention is prepared by the preparation method and is a vinyl chloride-based polymer having a quite small generation amount of total volatile organic compounds. The performance of the polymer may be the same as or better than the conventional one.

The vinyl chloride-based polymer according to the present invention may be, for example, a paste vinyl chloride-based polymer.

In addition, the vinyl chloride-based polymer according to an embodiment of the present invention may show different particle diameters according to each preparation method. Particularly, the vinyl chloride-based polymer prepared by seed emulsion polymerization may include particles having a small particle diameter with a particle diameter of 0.5 to 1.5 μm and particles having a large particle diameter of 1.6 to 3.5 μm, the vinyl chloride-based polymer prepared by microsuspension polymerization may have a particle diameter of 0.4 to 1.5 μm, and the vinyl chloride-based polymer prepared by emulsion polymerization may have a particle diameter of 0.1 to 0.4 μm.

In addition, the vinyl chloride-based polymer prepared by the preparation method according to an embodiment of the present invention may have a pH of 10 or more, preferably, 11 to 12.

3. Plastisol

The present invention provides a plastisol including the vinyl chloride-based polymer and a plasticizer.

The plastisol according to an embodiment of the present invention may further include a plasticizer in 40 parts by weight to 180 parts by weight, or 80 parts by weight to 160 parts by weight, or 100 parts by weight to 140 parts by weight based on 100 parts by weight of the vinyl chloride-based polymer and may further include an additive such as a dispersion diluent, a thermal stabilizer, a viscosity adjusting agent and a foaming agent as necessary.

The "plastisol" in the present invention represents a mixture of a resin and a plasticizer so as to mold, cast or process into a continuous film phase by heating, for example, may represent a paste phase obtained by mixing a vinyl chloride-based polymer and a plasticizer.

The "plasticizer" in the present invention may represent an organic additive material which plays the role of improving molding processability of a resin at a high temperature by adding to a thermoplastic resin to increase thermoplasticity.

The plasticizer and the additive may use common ones well-known in the art.

The plastisol according to an embodiment of the present invention includes the vinyl chloride-based polymer prepared by the preparation method and has excellent viscosity properties, and may have excellent processability, other performance properties and foaming properties.

EXAMPLES

Hereinafter, the present invention will be explained in more detail referring to embodiments. However, the following embodiments are for illustrating the present invention, and the scope of the present invention is not limited thereto.

Example 1

1) Preparation of First Seed Particles

To a high pressure reactor of 200 L, 73 kg of deionized water, 1.21 kg of lauryl peroxide (LPO), and 0.9 g of paraquinone were injected, and vacuum of −730 mmHg was applied. To the reactor in a vacuum state, 66 kg of a vinyl chloride monomer and 7.8 kg of sodium dodecyl benzene sulfonate were injected, followed by mixing by stirring for 15 minutes. The inner temperature of the reactor was decreased to 20° C. or less, and homogenization using a rotor-stator type homogenizer was performed for 2 hours.

After completing the homogenization, the inner temperature of the reactor was controlled to 42° C., and polymerization was performed. After 558 minutes, if the pressure of the reactor reached 3.5 kg/cm 2, the reaction was finished, and an unreacted vinyl chloride monomer was recovered and removed to obtain first seed particles having an average particle diameter of 0.68 μm.

2) Preparation of Second Seed Particles

To a high pressure reactor of 500 L, 230 kg of water, 790 g/240 g of a first emulsifier (lauric acid/NaOH), and 110 g of a water-soluble initiator (KPS: potassium persulfate) were injected, and while stirring, vacuum was applied to the reactor. To the reactor in a vacuum state, 185 kg of a vinyl chloride monomer was injected, and then, the temperature of the reactor was elevated to 56° C. and polymerization was performed. Once the polymerization reaction was initiated, 11.1 kg of a second emulsifier (sodium dodecyl benzene sulfonate) was continuously injected to the reactor for 5 hours. If the pressure of the reactor reached 4 kg/cm 2, the reaction was finished, an unreacted vinyl chloride monomer was recovered and removed to prepare a vinyl chloride-based seed having an average particle diameter of 0.12 μm.

3) Preparation of Vinyl Chloride Polymer

To a high pressure reactor of 500 L, 150 kg of water, 15 kg of the first seed particles having an average particle diameter of 0.68 μm, and 6 kg of the second seed particles having an average particle diameter of 0.12 μm were injected, and while stirring, vacuum was applied to the reactor. To the reactor in a vacuum state, 215 kg of a vinyl chloride monomer was injected, and then, the temperature of the reactor was elevated to 58° C. and seed emulsion polymerization was performed. After initiating the polymerization reaction, the injection of sodium carbonate ($Na_2CO_3$) was started immediately (conversion rate 0%), 100 ppm (22 g) was injected based on the total weight of the vinyl chloride monomer until the conversion rate became about 1%, and polymerization reaction was performed. At the finishing point of the reaction, 2.8 kg (1.3 parts by weight) of a mixture of lauric acid and potassium hydroxide (lauric acid:potassium hydroxide=1:1) was injected as an emulsifier and then stirred for 30 minutes. Then, an unreacted vinyl chloride monomer was recovered and removed to prepare a vinyl chloride polymer. The vinyl chloride-based polymer thus prepared was sprayed and dried to obtain a vinyl chloride-based polymer as a particulate material.

Example 2

A vinyl chloride-based polymer was prepared by the same method as in Example 1 except for injecting 500 ppm of sodium carbonate ($Na_2CO_3$) in Example 1.

Example 3

A vinyl chloride-based polymer was prepared by the same method as in Example 1 except for injecting 800 ppm of sodium carbonate ($Na_2CO_3$) in Example 1.

Example 4

A vinyl chloride-based polymer was prepared by the same method as in Example 1 except for continuously injecting 900 ppm of sodium carbonate ($Na_2CO_3$) from a point where a polymerization conversion rate was 2% to a point of 4% in Example 1.

Example 5

A vinyl chloride-based polymer was prepared by the same method as in Example 1 except for continuously injecting 1000 ppm of sodium carbonate ($Na_2CO_3$) from a point where a polymerization conversion rate was 5% to a point of 7% in Example 1.

Example 6

A vinyl chloride-based polymer was prepared by the same method as in Example 1 except for continuously injecting 1000 ppm of sodium carbonate ($Na_2CO_3$) from a point where a polymerization conversion rate was 8% to a point of 10% in Example 1.

Example 7

A vinyl chloride-based polymer was prepared by the same method as in Example 1 except for injecting sodium sulfite ($Na_2SO_3$) instead of sodium carbonate ($Na_2CO_3$) in Example 1.

Example 8

To a high pressure reactor of 500 L, 100 parts by weight of water, 0.01 parts by weight of sodium lauryl sulfate as a first emulsifier, and 0.06 parts by weight of potassium persulfate (KPS) were injected, and while stirring, vacuum of 730 mmHg was applied to the reactor. To the reactor in a vacuum state, 100 parts by weight of a vinyl chloride monomer was injected, and the temperature of the reactor was elevated to 56° C. and polymerization was performed. After initiating the polymerization, 1 part by weight of sodium lauryl sulfate was continuously injected to the reactor as a second emulsifier for 8 hours. After initiating the polymerization reaction, 800 ppm of sodium carbonate was continuously injected based on the total weight of the vinyl chloride monomer until the polymerization conversion rate became about 1% to perform the polymerization reaction. At the finishing point of the reaction, 2.4 kg (1.3 parts by weight) of a mixture of lauric acid and potassium hydroxide (lauric acid:potassium hydroxide=1:1) was injected as an emulsifier and then stirred for 30 minutes. Then, if the pressure of the reactor reached 4 kg/cm², the reaction was finished, an unreacted vinyl chloride monomer was recovered and removed to prepare a vinyl chloride polymer. The vinyl chloride-based polymer thus prepared was sprayed and dried to obtain a vinyl chloride-based polymer as a particulate material.

Example 9

In a high pressure reactor of 500 L, 130 kg of water, a mixture obtained by mixing 1.5 kg of an emulsifier (sodium lauryl sulfate) and 4.5 kg of a fatty acid alcohol, 6 kg of an oil-soluble initiator (di-2-ethyl hexyl peroxydicarbonate) and 220 kg of a vinyl chloride monomer were mixed through vigorous stirring, a homogenizer was operated by distributing a total pressure of 1400 psi to a front part and a rear part in a ratio of 50:50, the reactant was transported to a 1 m 3 reactor, inner temperature (45° C.) was set, and polymerization reaction was performed. Once the polymerization reaction was started, a second emulsifier (sodium lauryl sulfate) was continuously injected to the reactor during polymerization time. After initiating the polymerization reaction, 800 ppm of sodium carbonate was continuously injected based on the total weight of the vinyl chloride monomer from a point where a polymerization conversion rate was 0% to a point of about 1%. After finishing main reaction, an unreacted vinyl chloride monomer was recovered and removed to prepare a microsuspension polymerized latex.

Comparative Example 1

A vinyl chloride-based polymer was prepared by the same method as in Example 1 except for not injecting sodium carbonate.

Comparative Example 2

A vinyl chloride-based polymer was prepared by the same method as in Example 1 except for injecting sodium hydroxide instead of sodium carbonate at a point of injecting water before initiating polymerization and before applying vacuum to the reactor.

Comparative Example 3

A vinyl chloride-based polymer was prepared by the same method as in Example 1 except for injecting sodium hydrogen carbonate (sodium bicarbonate, $NaHCO_3$) instead of sodium carbonate at a point of injecting water before initiating polymerization and before applying vacuum to the reactor.

Comparative Example 4

A vinyl chloride-based polymer was prepared by the same method as in Example 1 except for injecting sodium carbonate at a point of injecting water before initiating polymerization and before applying vacuum to the reactor.

Comparative Example 5

A vinyl chloride-based polymer was prepared by the same method as in Example 1 except for injecting 800 ppm of sodium hydrogen carbonate (sodium bicarbonate, $NaHCO_3$) instead of sodium carbonate at a point of injecting water before initiating polymerization and before applying vacuum to the reactor.

Comparative Example 6

A vinyl chloride-based polymer was prepared by the same method as in Example 1 except for injecting 1000 ppm of sodium carbonate at a point of injecting water before initiating polymerization and before applying vacuum to the reactor.

Comparative Example 7

A vinyl chloride-based polymer was prepared by the same method as in Example 1 except for injecting sodium hydroxide instead of sodium carbonate.

Comparative Example 8

A vinyl chloride-based polymer was prepared by the same method as in Example 1 except for injecting 10 ppm of sodium carbonate.

Comparative Example 9

A vinyl chloride-based polymer was prepared by the same method as in Example 1 except for injecting 1500 ppm of sodium carbonate.

Comparative Example 10

A vinyl chloride-based polymer was prepared by the same method as in Example 1 except for injecting sodium carbonate at a point where a polymerization conversion rate was 50%.

Comparative Example 11

A vinyl chloride-based polymer was prepared by the same method as in Example 1 except for injecting sodium carbonate at a point where a polymerization conversion rate was 80%.

Experimental Examples

The vinyl chloride polymers of the Examples and Comparative Examples were evaluated for the items below, and the results are shown in Table 1 below.

1) Polymerization Time

The polymerization time was obtained by measuring from a reaching point to a polymerization setting temperature (about 47° C.) to a set blow down pressure (about 4 kg/cm²).

2) Total Volatile Organic Compound Content

Foreign materials on a dish were removed in an oven of 100° C. for 1 hour, and the weight of a vacant dish was measured. Then, 1 g of a specimen for measurement (polymer prepared) was put on the dish, and the weight was measured. After standing the dish with the specimen at room temperature for 10-15 minutes, the dish with the specimen was stood at 100° C. for 2 hours for volatilization, the volatilized specimen was stood at room temperature for 10-15 minutes, and the weight was measured. The total volatile organic compound content was calculated through the following Mathematical Formula 1:

(total volatile organic compound content,VOC) (weight of specimen after volatilization)/(weight of specimen before volatilization)×100 [Mathematical Formula 1]

TABLE 1

| Division | Buffer agent | | | | | |
| --- | --- | --- | --- | --- | --- | --- |
| | Injection time (polymerization conversion rate, %) | Kind | Injection amount (ppm) | VOC content % | Index* | Polymerization time (min) |
| Example 1 | 0-1 | $Na_2CO_3$ | 100 | 0.68 | 48 | 655 |
| Example 2 | 0-1 | $Na_2CO_3$ | 500 | 0.68 | 48 | 655 |
| Example 3 | 0-1 | $Na_2CO_3$ | 800 | 0.69 | 49 | 670 |
| Example 4 | 2-4 | $Na_2CO_3$ | 900 | 0.66 | 47 | 645 |
| Example 5 | 5-7 | $Na_2CO_3$ | 1000 | 0.69 | 49 | 660 |
| Example 6 | 8-10 | $Na_2CO_3$ | 1000 | 0.68 | 48 | 670 |
| Example 7 | 0-1 | $Na_2SO_3$ | 100 | 0.69 | 49 | 660 |
| Example 8 | 0-1 | $Na_2CO_3$ | 800 | 0.68 | 48 | 665 |
| Example 9 | 0-1 | $Na_2CO_3$ | 800 | 0.69 | 49 | 670 |
| Comparative Example 1 | — | X | — | 1.40 | 100 | 640 |
| Comparative Example 2 | Before vacuumizing reactor | NaOH | 100 | 0.77 | 55 | 760 |

TABLE 1-continued

| Division | Buffer agent Injection time (polymerization conversion rate, %) | Kind | Injection amount (ppm) | VOC content % | Polymerization time Index* | (min) |
|---|---|---|---|---|---|---|
| Comparative Example 3 | Before vacuumizing reactor | NaHCO$_3$ | 100 | 1.30 | 93 | 655 |
| Comparative Example 4 | Before vacuumizing reactor | Na$_2$CO$_3$ | 100 | 1.24 | 89 | 650 |
| Comparative Example 5 | Before vacuumizing reactor | NaHCO$_3$ | 800 | 0.72 | 51 | 810 |
| Comparative Example 6 | Before vacuumizing reactor | Na$_2$CO$_3$ | 1000 | 0.69 | 49 | 840 |
| Comparative Example 7 | 0-1 | NaOH | 100 | 0.73 | 52 | 750 |
| Comparative Example 8 | 0-1 | Na$_2$CO$_3$ | 10 | 1.37 | 98 | 645 |
| Comparative Example 9 | 0-1 | Na$_2$CO$_3$ | 1500 | Not finished due to reaction delay | | |
| Comparative Example 10 | 50 | Na$_2$CO$_3$ | 100 | 1.35 | 96 | 640 |
| Comparative Example 11 | 80 | Na$_2$CO$_3$ | 100 | 1.40 | 100 | 640 |

*relative value if the value of Comparative Example 1 was set to 100
*Examples 1 to 7 and Comparative Examples 1 to 11: seed emulsion polymerization (microsuspension seed polymerization)
*Example 8: pure emulsion polymerization
*Example 9: microsuspension polymerization As shown in Table 1, it could be confirmed that Examples 1 to 9 showed decreased polymerization time and/or generation amount of total volatile organic compounds when compared with Comparative Examples 1 to 11.

Particularly, it could be confirmed that in Comparative Example 1 in which an ionizable normal salt was not injected, polymerization time was relatively long and the generation amount of VOC was significantly large, and in Comparative Example 2 in which a strong base such as sodium hydroxide was injected at the initial stage of the reaction, the VOC content was not significantly decreased, and polymerization time was also long, and thus, productivity was bad.

In addition, it could be confirmed that in Comparative Examples 3 and 4, in which sodium hydrogen carbonate and sodium carbonate were injected, respectively, at the initial stage of the reaction, the possibility of improving polymerization time was found but the generation amount of VOC was a significantly high degree. In Comparative Examples 5 and 6 with the increased amount of sodium hydrogen carbonate and sodium carbonate, respectively, the generation amount of VOC was decreased but the polymerization time was significantly increased. Accordingly, it could be confirmed that if the injection time was not controlled, productivity was decreased.

In addition, in case where NaOH was injected at the same point as that of Examples 1 to 3, it could be confirmed that the decreasing effects of the generation amount of VOC did not reach the degree of the Examples and the polymerization time was long, and thus, productivity was not good. In Comparative Example 8 in which an ionizable normal salt was injected in a small amount, the generation amount of VOC was significant, and in Comparative Example 9 in which an ionizable normal salt was injected in a large amount, the polymerization was not even finished. In Comparative Examples 10 and 11, in which an ionizable normal salt was injected at a point where a polymerization conversion rate was 50% or more, it could be found that the decreasing effects of the generation amount of VOC could not be achieved at all.

Through the results, it could be confirmed that the polymerization time may be controlled in a normal operation range without degrading volatile loss through the control of the injection time and amount of a buffer agent, and the use of such buffer agent is inadequate in suspension polymerization.

The invention claimed is:

1. A method for preparing a vinyl chloride-based polymer, the method comprising:
    a step of injecting an ionizable normal salt and polymerizing a vinyl chloride monomer in the presence of one or more emulsifiers and a polymerization initiator,
    wherein the ionizable normal salt comprises a carbonate metal salt or a sulfite metal salt, wherein the ionizable normal salt is continuously injected in an amount of 70 to 1200 ppm based on the total weight of the vinyl chloride monomer when a polymerization conversion rate is in a range of 0% to 20%,
    wherein when the polymerization conversion rate being 0% is a point where polymerization reaction begins immediately after initiating the polymerization of the vinyl chloride monomer,
    wherein the polymerization is performed by the steps comprising:
    injecting supplementary materials comprising an emulsifier and water to a reactor;
    applying vacuum to the reactor and then injecting the polymerization initiator and the vinyl chloride monomer; and
    continuously injecting the ionizable normal salt to the reactor after the inner temperature of the reactor reaches 30 to 70° C.

2. The method according to claim 1, wherein the carbonate metal salt is selected from the group consisting of sodium carbonate (Na$_2$CO$_3$), potassium carbonate (K$_2$CO$_3$), magnesium carbonate (MgCO$_3$) and calcium carbonate (CaCO$_3$), and
    the sulfite metal salt is selected from the group consisting of sodium sulfite (NaSO$_3$), potassium sulfite (K$_2$SO$_3$), magnesium sulfite (MgSO$_3$) and calcium sulfite (CaSO$_3$).

3. The method according to claim 1, wherein the ionizable normal salt is injected when the polymerization conversion rate is in a range of 0% to 10%.

4. The method according to claim 1, wherein the ionizable normal salt is injected in an amount of 100 to 1000 ppm based on the total weight of the vinyl chloride monomer.

5. The method according to claim 1, wherein polymerizing the vinyl chloride monomer is performed by any one method selected from the group consisting of pure emulsion polymerization, seed emulsion polymerization and microsuspension polymerization.

* * * * *